(12) United States Patent
Donaldson

(10) Patent No.: US 6,848,419 B1
(45) Date of Patent: Feb. 1, 2005

(54) WETSTACKING AVOIDANCE IN INTERNAL COMBUSTION ENGINES

(75) Inventor: A. Burl Donaldson, Albuquerque, NM (US)

(73) Assignee: New Mexico State University Technology Transfer Corporation, Las Cruces, NM (US)

(*) Notice: Subject to any disclaimer, the term of this patent is extended or adjusted under 35 U.S.C. 154(b) by 289 days.

(21) Appl. No.: 10/043,006

(22) Filed: Jan. 8, 2002

Related U.S. Application Data
(60) Provisional application No. 60/260,550, filed on Jan. 8, 2001.

(51) Int. Cl.[7] ............................................. F02D 41/00
(52) U.S. Cl. ...................... 123/349; 123/350; 123/676; 123/396
(58) Field of Search ............................... 123/350, 676, 123/672, 394, 396

(56) References Cited

U.S. PATENT DOCUMENTS

| | | | |
|---|---|---|---|
| 4,020,814 A | | 5/1977 | Hewitt et al. |
| 4,207,848 A | | 6/1980 | Dinger et al. |
| 4,254,752 A | | 3/1981 | Friddell et al. |
| 4,367,700 A | | 1/1983 | Pace |
| 4,545,357 A | | 10/1985 | Kearsley et al. |
| 4,723,527 A | | 2/1988 | Panten et al. |
| 4,944,260 A | | 7/1990 | Shea et al. |
| 4,951,460 A | | 8/1990 | Prochaska et al. |
| 5,083,423 A | | 1/1992 | Prochaska et al. |
| 5,094,198 A | | 3/1992 | Trotta et al. |
| 5,158,063 A | * | 10/1992 | Hosoda et al. ............... 123/676 |
| 5,303,168 A | * | 4/1994 | Cullen et al. ................ 700/299 |
| 5,724,950 A | * | 3/1998 | Shino et al. ................. 123/676 |
| 6,704,641 B2 | * | 3/2004 | Tashiro et al. .............. 701/110 |
| 2002/0073696 A1 | | 6/2002 | Kuenstler et al. |
| 2002/0078681 A1 | | 6/2002 | Carberry et al. |

OTHER PUBLICATIONS

Black, Stephen, et al., "Some Observations on Operation of a Diesel Engine With Ethanol and Ethanol–Water Blends and Combustion Air Preheat," *Proc 1998 Tech Meeting Central States Section of the Combustion Inst.*, pp 231–236 (1998).

Donaldson, A.B., Final Report for U.S. Army Contract *New Mexico State University* May 18, 2001.

Garrett, K. "Reducing Diesel Exhaust Gas Odour—an Account of Some Work Done by MAN," *S. African Mech. Engineer*, vol. 28, pp 46–47 (Feb. 1978).

Johnson, R.A., et al., Diesel–Electric Power in Alaska—The Part–Load Problem, *The Northern Engineer*, vol. 18, No. 1, pp 4–7 (Spring 1986).

Wantanabe, E., et al., "Throttling of 2–Stroke Cycle Diesel Engines at Part–Load and Idling", *Society of Automotive Engineers International Automotive Engineering Congress* (1973).

\* cited by examiner

*Primary Examiner*—Bibhu Mohanty
(74) *Attorney, Agent, or Firm*—Peacock Myers & Adams PC

(57) ABSTRACT

An apparatus and method for reducing or eliminating wetstacking in internal combustion engine systems operating substantially under capacity comprising establishing an exhaust temperature minimum set point, monitoring exhaust temperature of an engine; and restricting air intake into the engine when the temperature is below the set point. Intake air may also be heated when the exhaust temperature is below the set point, with the intake air divided into first and second paths, the first path being restricted and the second path being heated. The second path preferably comprises a fixed flow choke.

28 Claims, 1 Drawing Sheet

WETSTACKING AVOIDANCE IN INTERNAL COMBUSTION ENGINES

CROSS-REFERENCE TO RELATED APPLICATIONS

This application claims the benefit of the filing of U.S. Provisional Patent Application Ser. No. 60/260,550, entitled "Wetstacking in Diesel Engine Driven Electric Generators", filed on Jan. 8, 2001, and the specification thereof is incorporated herein by reference.

GOVERNMENT RIGHTS

The U.S. Government has a paid-up license in this invention and the right in limited circumstances to require the patent owner to license others on reasonable terms as provided for by the fun terms of Contract No. DAAB15-00-M-0003 awarded by the U.S. Army. The Final Report dated May 18, 2001, entitled "Elimination of Wetstacking on Diesel-Engine-Driven Electric Generator for Project Manager-Mobile Electric Power Tactical Quiet Generators (TQGs)" is incorporated herein by reference.

BACKGROUND OF THE INVENTION

1. Field of the Invention (Technical Field):

The present invention relates to avoidance of wetstacking in internal combustion engines, especially in diesel-powered electric generators.

2. Background Art:

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Diesel engine driven electric generators sometimes operate for extended periods with little or no load. Under these conditions, the performance of the engine will deteriorate and if no intervention is taken, such as imposition of a load, it will ultimately fail and require expensive overhaul. The basic mechanism is not well understood, but unburned liquid hydrocarbons and/or soot in the exhaust or piston ring grooves are usually noted. The condition is referred to as "wetstacking".

The term wetstacking is attached to any of several causes of deteriorating performance or failure of diesel engines following operation at unloaded/underloaded conditions for extended periods of time. It has been noted to occur principally in stand-by electric generator applications corresponding to engine operation when zero or only partial power output is needed. In a circumstance such as remote field operations, the generator may be the only source of power and it can potentially operate continuously at unloaded/underloaded conditions.

Observables regarding onset of wetstacking are not definite and well documented, so unless some record of load as a function of time is maintained, rough running or failure of the engine sometimes is the first evidence of a problem. Postmortem examination of failed engines by mechanics and engineers has provided information regarding the typical failure mechanism. One observation is that liquid hydrocarbons of unspecified origin can accumulate on the exhaust valve stem where the stem is exposed to the engine exhaust. As the valve moves up and down in the close tolerance valve guide, the liquid film becomes sticky and eventually causes the valve stem to seize in the guide. The valve is then immobile, and because of the hard linkage in the valve train, some mechanical member will bend or break. The engine is then out of service and cannot be recovered without extensive repairs.

Wetstacking also occurs when solid carbon or nonvolatile liquids accumulate along the cylinder wall or in the piston ring grooves and inhibit expansion and sealing of the ring against the cylinder wall. The cylinder can become glazed which further contributes to poor charge air compression heating and poor combustion of fuel. The performance of the engine continues to deteriorate until charge air compression heating is no longer sufficient for the engine to operate. The engine must then be disassembled and the carbon removed and the cylinders re-honed. Although these failure mechanisms are somewhat different, they are both presumed to be related to poor combustion of the fuel or high liquid carryover into the exhaust when the engine is operating cool, i.e., unloaded/underloaded.

In order to avoid failures from either type of wetstacking, the conventional advice is that the engine should never be operated for extended periods of time at less than half-load. In order to assure that the engine operates at a load of at least 50%, artificial loads are sometimes applied. For electric generators, a resistive heater can be used for load, and the resulting heat dissipated either to air directly, or through the engine radiator. The shortcoming of this approach is that both fuel consumption and wear on the engine may be unnecessarily increased. An alternate to using the artificial load has been to monitor the carbon or unburned fuel content of the crankcase oil and when a threshold value is reached the oil is changed. This approach is premised on the concept that carbon or raw fuel on the cylinder walls and in the ring grooves can be washed down by the lubricating oil, but once the oil carbon or fuel content becomes high, the oil itself provides the mechanism whereby carbon is transported to the piston-cylinder clearance. Another method for dealing with wetstacking is to use a fuel additive that will encourage complete combustion. While some benefit was noted in this study, fuel additives are not compatible with single fuel strategies.

It is generally known that combustion processes are improved when the reaction temperature is high; conversely when low. This advice relates to pollution emissions such as carbon monoxide, unburned fuel, partially combusted or reformed hydrocarbons, and soot. Because an electric generator must operate at a constant speed in order to produce the desired electric output frequency, and because the amount of air passing through a diesel engine is only a function of speed, then low loads correspond to low fuel/air ratios. Consequently, the excess air dilutes energy released by fuel combustion with a consequential lowered product gas temperature. Diesel engines are always designed so that sufficient air is available to react completely with all of the fuel that is supplied at full load.

An excellent overview of operations contributing to wetstacking, symptoms of wetstacking and various methods for avoidance were given by Ronald A. Johnson, et al.; "The Part-Load Problem", *The Northern Engineer*, Vol. 18, No. 1, pp. 4–7 (Spring 1986). K. Garrett, "Reducing diesel exhaust gas odour—an account of some work done by Man", *The South African Mechanical Engineer*, Vol. 28, pp. 46–47 (February 1978) provides recommendations for reducing diesel exhaust gas odors, including intake throttling and injection air heating. The goal was to reduce exhaust odor that was attributed to incomplete combustion, rather than to eliminate wetstacking, and the method of intake air heating utilized a small combustor ahead of the intake manifold. Work by Watanabe et al., "Throttling of 2-Stroke Cycle Diesel Engines at Part-Load and Idling", Society of Automotive Engineers International Automotive Engineering Congress (1973) related to wetstacking in a two cycle diesel engine and throttling was accomplished by bypass of the scavenge air from the blower.

In the patent literature, U.S. Pat. Nos. 4,951,460 and 5,083,423 deal with turbine engines and will not be discussed further because these engines are noted to exhibit a different manifestation of poor combustion, i.e., build-up of incomplete combustion product deposits in the combustor or turbine blades. In fact, the problem is more difficult here because turbine engines must pass massive amounts of excess air to moderate combustion temperature at full load. As with diesel engines, turbine engines pass a constant amount of air through the compressor for a given speed, but at low loads, very little fuel is burned so the combustion is ultra-cool and incomplete.

U.S. Pat. Nos. 4,207,848, 4,545,357, 4,723,527, 4,944,260, and 5,094,198 all provide various methods and controls to elevate intake air temperature. The elevation of intake air will address the basic problem of cool combustion, but the source of heat is the concern. For example, water jacket heat exchange can be used, but the temperature is thermostatically controlled to around 185 F; far too cool for sufficient intake air heating. Alternately, the exhaust is sufficiently hot for heat exchange to provide adequate intake air heating. However, soot always occurs in the exhaust of a diesel engine and this will ultimately foul the surfaces and can cause a variety of problems including possible ignition of the carbon residue, or at minimum, a degradation of the heat exchange surfaces. If the engine is driving an electric generator, a resistive heating element can be used, but this will draw additional power from the engine, with additional fuel consumption.

U.S. Pat. No. 4,020,814 actually seeks the opposite effect; that is, the limitation of the combustion temperature, which is to be accomplished by limiting fuel flow to the engine. This action does not contribute to solving the wetstacking problem.

U.S. Pat. No. 4,367,700 advocates the dedication of two cylinders of a six cylinder engine to combustion air preheat rather than power production, thereby creating a substantial derating of the engine. Because of the derating, this approach is not evaluated as feasible.

U.S. Pat. No. 4,254,752 relates to 2-cycle engines. The 2-cycle engine utilizes a mechanically driven blower in order to provide air for scavenging exhaust gases from the cylinder as ports in the cylinder wall are uncovered at around the midpoint of the piston down stroke. Because of this, the engine has much higher airflow than a naturally aspirated or even a turbocharged 4-cycle diesel engine. Consequently, for part load with full speed, a 2-cycle diesel engine passes copious volumes of excess air through the engine with limited fuel consumption, thereby exacerbating the wetstacking condition. This patent does state that the exhaust restriction method has application to 4-cycle diesel-engines, but no attempt is made to address adoption to that case. Superficially, this method is simpler and cheaper than the approach of the current patent application. In summary, the combustion temperature is made higher by the retention of an inverse fraction (to fuel flow) of the previous power stroke combustion gases via a "weighted" exhaust restricting butterfly valve. However, modification of injectors, as suggested in this patent, makes this approach considerably more expensive. The method does not provide for a minimum in combustion temperature because the restriction is not actively controlled to a parameter that is affected by the action that is taken. Further, the elevation of a weight about a pivot does not provide for a linear effect. In other words, the exerted force (and pressure) is greatest when the weight is horizontal and essentially zero when the weight is vertical. This method is in contrast to the present invention, which utilizes an observation (exhaust temperature) as a feedback that is directly related to the remedy that has been taken (restriction of excess air flow through the cylinder). Because the latter is a "smart" control, it can compensate for a number of variables, including: change of engine size, type (e.g., 2-cycle or 4 cycle) or manufacture, altitude change, intake (ambient) temperature change, engine performance degradation, etc. Expanding the comment on engine variety, the cited patent stipulates that it is applicable to multi-cylinder engines. This restriction is probably because for a single or 2-cylinder engine, there is pulsation in the exhaust flow as exhaust valves or ports are opened and closed. This pulsation would cause the exhaust restrictor valve weight to oscillate, thereby causing a feedback oscillation in all flows within the engine. Engine oscillations are generally highly undesirable. The current invention, however, is not subject to such oscillations because the controller will respond slower than the cycle time of the cylinder and will not subject the engine to pulsations. A consequence of the exhaust restriction approach is an increase in the cylinder pressure at all operating conditions. Elevated cylinder pressure can contribute to ring blow-by with dilution of crankcase oil, and exacerbate soot collection in piston ring grooves (associated with symptoms of wetstacking). And because even at full load there will always be a pressure restriction in the exhaust required to hold the weight in an elevated position, the thermal efficiency of the engine will unquestionably be compromised.

The present invention solves the wetstacking problem by raising the reaction temperature by (primarily) restricting the flow of intake air and (secondarily), if desired, elevating the temperature of the intake air, combined with "smart" control of those operations. In comparison to the case where there are no intervention measures, a given quantity of fuel releases a given amount of energy to the gas charge. If the initial temperature of the air is higher, then the final temperature of the gas after combustion will be higher. Or, if the amount of excess air in the charge is reduced, then the final temperature will be again higher. Consequently, both of these methods raise combustion temperature and either can be used as an intervention technique. For intake air heating, a heat exchanger with the engine exhaust is adequate. However, heat exchangers are somewhat expensive, comparatively large, and the exhaust side can foul, due to accumulation of soot on heat transfer surfaces. Intake air throttling can be done with a simple throttle valve that requires minimum space, is inexpensive, is reliable, and can be fully opened to return the engine to full power capability. Accordingly, the invention preferably restricts air intake according to a control mechanism, which is, if desired, supplemented by raising the temperature of intake air via water jacket heat exchange.

SUMMARY OF THE INVENTION
(DISCLOSURE OF THE INVENTION)

The present invention is of an apparatus and method for reducing or eliminating wetstacking in internal combustion engine systems operating substantially under capacity, comprising: establishing an exhaust temperature minimum set point; monitoring exhaust temperature of an engine; and restricting air intake into the engine when the exhaust temperature is below the set point. In one embodiment, intake air is heated when the exhaust temperature is below the set point, with the intake air divided into first and second paths, the first path being blocked and the second path being heated, and preferably wherein the second path comprises a fixed flow choke. Or in a second embodiment, a proportional controller may be employed to regulate amount of restriction. Air intake into the engine may be restricted via a proportionally controlled valve upstream of the intake manifold of the engine. The valve is preferably a butterfly valve or a valve that does not eliminate air intake even when fully closed.

The invention is also of an apparatus and method for reducing or eliminating wetstacking in internal combustion engine systems operating substantially under capacity, comprising: monitoring an operational parameter of an engine; and based on the parameter, restricting air intake into the engine via a valve upstream of the air intake manifold of the engine. In one embodiment, monitoring comprises monitoring exhaust temperature of the engine and the restriction is employed when the temperature is below a set point. In another embodiment, which may in combination with the temperature-based restriction, intake air is heated when the restriction is operating.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

Figure 1:
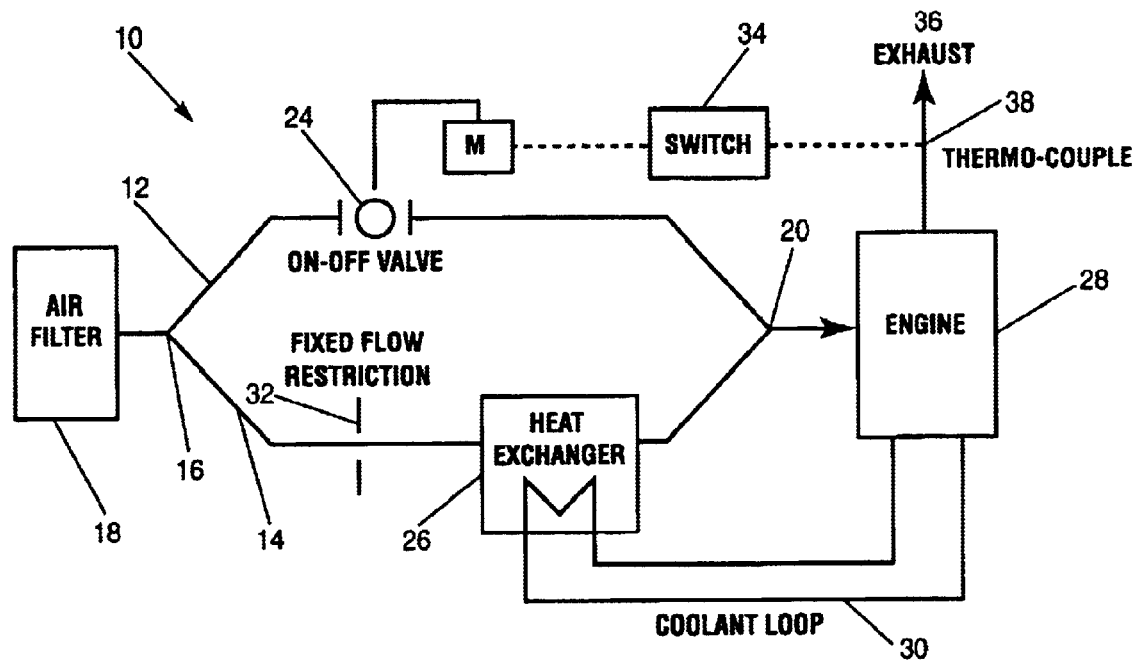
FIG. 1 is a schematic diagram of the fixed-geometry restriction embodiment of the invention.

DESCRIPTION OF THE PREFERRED EMBODIMENTS (Best Modes for Carrying out the Invention)

The present invention is of a method and apparatus for reducing or eliminating wetstacking in internal-combustion engines, particularly diesel-powered electric generators, via the elevation of combustion temperature by the controlled restriction of intake air, alternatively in combination with preheating intake air. The present invention additionally has the benefit of improving the ability to use alcohol (e.g., ethanol or methanol) in combustion engines.

The following discussion of preferred embodiments is directed to diesel electric generators, but the invention is suited to use with all diesel engines. In a diesel electric generator, as the intake air temperature is raised, the exhaust temperature approaches the intake air temperature asymptotically. It is preferable to employ the invention to maintain an exhaust temperature of 300 C or above when the motor is unloaded/underloaded.

In implementation of a method for dealing with wetstacking at low or no load, it is necessary that the engine be returned quickly to full load capability when power is demanded. This requires a control that has the capability of sensing when the load is below some selected value and implement the preferred method of wetstacking avoidance. When the load increases, the control must remove this modification. The type of control can be either proportional (smart controller) or modulating (dumb controller). In the proportional control, incremental adjustments can be made depending on the load whereas with modulating control, some switch is closed or opened and so the remediation is not steady but intermittent. In all cases, if the control operation is compromised, then the default position must be the removal of remediation measures. The overall design preferably fits the following criteria: a) it should be rugged and tolerate engine vibration, b) it should be simple, reliable, and easily serviced or replaced, c) it should be inexpensive and fit within the current enclosure, d) it should be compatible with refit to generators already in service.

A large number of parameters can be used to sense the load on the engine. Some of these have advantages for the current application. A list is given with comments on each.

Electric load: This is the most direct method for sensing load. The problem with this approach is that for 3 φ power, each leg load must be measured and added. This would require installation of components in the electrical side of the generator and so is not as field serviceable as other methods.

Fuel flow or throttle position: This method is also a reasonable approach. However, the metering of very small liquid flow rates is not accurate and the instrumentation is not simple, particularly when considering an environment with high vibration. The throttle position is an option but this is subject to linkage adjustments that may be somewhat different for each engine.

Intake manifold vacuum: It is reasonable to measure the intake manifold vacuum as an indicator of the effect of a restrictor position. The problem is that this requires calibration of a pressure sensing device and can be expensive. Additionally, without added cost, this method would not be able to compensate for altitude.

Exhaust temperature measurement: This method is preferred in that it is directly proportional to combustion temperature and temperature measuring devices are cheap and commonly used in harsh environments, providing that care is used in selecting the particular hardware and mounting method.

Both intake air restriction and intake air heating are capable of elevating the exhaust temperature of an unloaded engine sufficiently to match the 50% load case. Intake can be heated by each of three methods: electric heating, which can draw power from the underloaded generator, exhaust gas heat exchange, or cooling water jacket heat exchange. If electric heat is to be used, heating elements must not be fragile and vulnerable to engine vibration. Note that the artificial load on the engine will contribute to extra wear and extra fuel consumption. Exhaust gas heat exchange alone can adequately elevate the intake air temperature so that no additional intervention is necessary to achieve an exhaust temperature of 300 C. However, this heat exchanger is subject to degradation and fouling by accumulation of carbon on the exhaust gas side. Furthermore, heat exchangers can be large and somewhat expensive, particularly gas to gas. Heat exchange with engine cooling water has the advantage of liquid to gas heat exchange, which is somewhat easier than gas to gas and hence, is cheaper and more compact. Although this method has the advantage of maximum temperature control by thermostat, this heat source alone will not be sufficient to elevate intake air temperature to the criterion of 300 C exhaust temperature.

Intake air restriction is capable of achieving the desired exhaust temperature of 300 C with no other intervention measures. This can be implemented by using a valve that is capable of full open positioning when the engine is at full load. The valve preferably passes a minimum air flow even when the valve is full closed so that the engine will continue to run. Various valves that have a full open capability are ball (or plug) valves, gate valves, and butterfly valves. Each can be fit with an actuator: either rotational or linear to adjust the intake manifold vacuum according to the input measurement and the controller algorithm. The butterfly valve, very similar to that which is used in throttle body carburetion for spark ignition engines, is preferred to fulfill this role because it is simple, cheap, and can be easily controlled. A drilled hole in the plate can guarantee that the engine has sufficient air at no load to continue to operate.

Each of the intervention methods discussed, i.e., intake air heating, or intake air restriction, can be used singly or in combination. In other words, if the engine cooling water is passed through a heat exchanger, the intake air would be heated to a temperature only slightly below the thermostat setting, around 85 C. Then, air restriction to provide an intake manifold vacuum of 125 mm Hg should be sufficient to result in the exhaust temperature meeting the criterion of 300 C for a particular engine.

From the list of available input by which a controller can sense the engine load and take appropriate action, exhaust temperature is preferred. The preferred embodiments of the invention, especially for retrofit of existing generators, are next described.

In a first embodiment 10, and referring to FIG. 1, the intake air can pass through either of two parallel passages 12,14: a dividing Y 16 being placed downstream of the air filter 18 and a rejoin Y 20 just ahead of the intake manifold 22. One passage is the normal ducting to the intake manifold, except for the placement of a normally open, full port actuator controlled valve 24. The other passage preferably includes a heat exchanger 26, using either the engine 28 water jacket or the engine exhaust via coolant loop 30. This passage preferably also includes a fixed flow choke 32 to restrict flow with an orifice of sufficient size to bring the exhaust temperature at no load to 300 C. The controller 34 preferably employs engine exhaust 36 temperature as input, such as measured by thermocouple 38. When that temperature drops below the set point of 300 C, the controller will close the valve and force flow through the choke and heat exchanger. If the exhaust temperature increases above a dead band, then the valve will open. Consequently, the control is modulating. The passage that includes the heat exchanger and throttle will be left open even when the other passage is also open. Because of the flow resistance, most of the intake air will bypass the heat exchanger/restrictor route. Providing that there is sufficient thermal inertia in the heat exchanger and providing that the valve has a high capability for cycling, then the exhaust temperature can be maintained at or above the set point. All of the components required to implement this embodiment are off the shelf.

Figure 2:
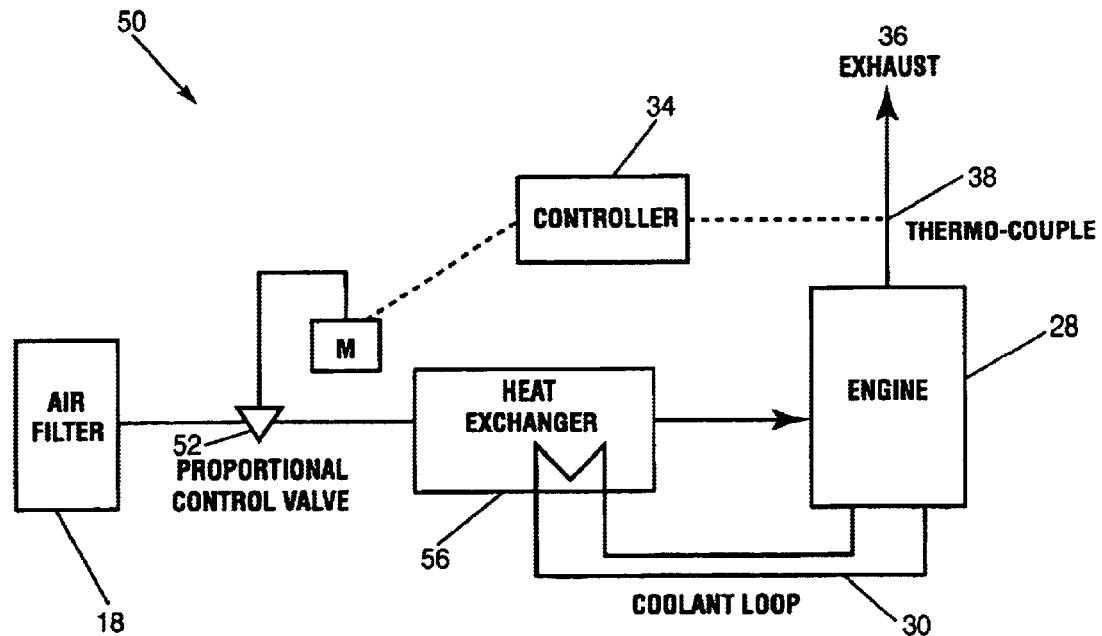
FIG. 2 is a schematic diagram of the proportional control embodiment of the invention.

The embodiment 50 of FIG. 2 preferably employs a smart or proportional controller 34 that will actuate a valve 52 to provide for a variable amount of intake air restriction based on input from an exhaust temperature measurement. A heat exchanger 56 can also be used with this air intake in order to provide part of the relief. However, if sufficient restriction can be provided, then this implementation is preferred i.e., without heat exchange. The exhaust temperature responds very quickly to load (less than one second) and such controller requires perhaps another second to reset the valve position to provide the appropriate level of intake air restriction. The gain on the controller can be set so as to minimize "hunting" for proper setting. The control valve preferred for intake air restriction is a butterfly valve. This embodiment has the capability of being reprogrammed in the field to change the set temperature, or the gain. The linkage between the actuator and the valve is preferably configured so that vibration would not wallow out hard links. When operating without a heat exchanger, only three components are required: the intake valve, the controller, and exhaust temperature measurement. These three components require a minimum of space and are inexpensive.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for reducing or eliminating wetstacking in internal combustion engine systems operating substantially under capacity, the method comprising the of:

establishing an exhaust temperature minimum set point;

monitoring exhaust temperature of an engine; and restricting air intake into the engine when the temperature is below the set point.

2. The method of claim 1 additionally comprising the step of heating intake air when the exhaust temperature is below the set point.

3. The method of claim 2 additionally comprising the step of dividing intake air into first and second paths, the first path operated on by the restricting step and the second path operated on by the heating step, wherein the second path comprises a fixed flow choke.

4. The method of claim 1 wherein the restricting step employs a proportional controller to regulate amount of restriction.

5. The method of claim 1 wherein the restricting step comprises restricting air intake into the engine via a valve upstream of an intake manifold of the engine.

6. The method of claim 5 wherein the restricting step comprises restricting air intake into the engine via a butterfly valve upstream of an intake manifold of the engine.

7. The method of claim 5 wherein the restricting step comprises restricting air intake into the engine via a valve upstream of an intake manifold of the engine, wherein the valve does not eliminate air intake even when fully closed.

8. A method for reducing or eliminating wetstacking in internal combustion engine systems operating substantially under capacity, the method comprising the steps of:

monitoring an operational parameter of an engine; and based on the parameter indicating that the engine is operating substantially under capacity, restricting air intake into the engine via a valve upstream of an intake manifold of the engine.

9. The method of claim 8 wherein the monitoring step comprises monitoring exhaust temperature of the engine and the restricting step is employed when the temperature is below a set point.

10. The method of claim 8 additionally comprising the step of heating intake air when the restricting step is operating.

11. An apparatus for reducing or eliminating wetstacking in internal combustion engine systems operating substantially under capacity, said apparatus comprising:

means for monitoring exhaust temperature of an engine; and means for restricting air intake into the engine when the temperature is below an exhaust temperature minimum set point.

12. The apparatus of claim 11 additionally comprising means for heating intake air when the exhaust temperature is below the set point.

13. The apparatus of claim 12 additionally comprising means for dividing intake air into first and second paths, the first path operated on by the restricting means and the second path operated on by the heating means, wherein the second path comprises a fixed flow choke.

14. The apparatus of claim 11 wherein the restricting means comprises a proportional controller to regulate amount of restriction.

15. The apparatus of claim 11 wherein the restricting means comprises means for restricting air intake into the engine via a valve upstream of an intake manifold of the engine.

16. The apparatus of claim 15 wherein the restricting means comprises means for restricting air intake into the engine via a butterfly valve upstream of an intake manifold of the engine.

17. The apparatus of claim 15 wherein the restricting means comprises means for restricting air intake into the engine via a valve upstream of an intake manifold of the engine, wherein the valve does not eliminate air intake even when fully closed.

18. An apparatus for reducing or eliminating wetstacking in internal combustion engine systems operating substantially under capacity, said apparatus comprising:

means for monitoring an operational parameter of an engine; and means for restricting air intake into the engine, based on the parameter indicating that the engine is operating substantially under capacity, via a valve upstream of an intake manifold of the engine.

19. The apparatus of claim 18 wherein the monitor means comprises means for monitoring exhaust temperature of the engine and the restricting means operates when the temperature is below a set point.

20. The apparatus of claim 18 additionally comprising means for heating intake air when the restricting means is operating.

21. The method of claim 1 wherein the engine comprises an alcohol burning engine.

22. The method of claim 1 wherein the engine comprises a diesel burning engine.

23. The method of claim 8 wherein the engine comprises an alcohol burning engine.

24. The method of claim 8 wherein the engine comprises a diesel burning engine.

25. The apparatus of claim 11 wherein said engine comprises an alcohol burning engine.

26. The apparatus of claim 11 wherein said engine comprises a diesel burning engine.

27. The apparatus of claim 18 wherein said engine comprises an alcohol burning engine.

28. The apparatus of claim 18 wherein said engine comprises a diesel burning engine.

* * * * *